United States Patent

Honda et al.

[11] Patent Number: 5,708,543
[45] Date of Patent: Jan. 13, 1998

[54] MAGNETIC HEAD WITH GLASS USED TO BOND TOGETHER TWO CORE HALVES HAVING A COEFFICIENT OF THERMAL EXPANSION LESS THAN THAT OF THE FERROMAGNETIC OXIDE USED TO MAKE THE CORE HALVES

[75] Inventors: Junichi Honda; Norikatsu Fujisawa, both of Miyagi, Japan

[73] Assignee: Sony Corporation, Tokyo, Japan

[21] Appl. No.: 655,673

[22] Filed: May 30, 1996

[30] Foreign Application Priority Data

May 31, 1995 [JP] Japan .................. 7-134122

[51] Int. Cl.[6] .................................................. G11B 5/23
[52] U.S. Cl. .................. 360/119; 360/120; 360/125; 29/603.21
[58] Field of Search .................... 360/103, 119, 360/120, 125, 126; 29/603.21

[56] References Cited

U.S. PATENT DOCUMENTS 5,086,553  2/1992  Goto et al. .................... 360/103
5,157,569  10/1992 Kumasaka et al. ............. 360/119
5,270,894  12/1993 Okuda et al. .................. 360/126

*Primary Examiner*—Jefferson Evans
*Attorney, Agent, or Firm*—Hill, Steadman & Simpson

[57] ABSTRACT

A magnetic head according to the present invention can generate excellent readout output even with a reduced track width by controlling the stress applied to the half magnetic cores from the glass. The magnetic head comprises a pair of magnetic cores made of ferromagnetic oxide, at least one of which has a groove for a coil and which are bonded together with the glass with a gap material in-between, wherein the coefficient of thermal expansion of the glass to bond magnetic cores together is smaller than that of the ferromagnetic oxide by $20 \times 10^{-7}$ to $35 \times 10^{-7}$ per degree Celsius.

7 Claims, 4 Drawing Sheets

MAGNETIC HEAD WITH GLASS USED TO BOND TOGETHER TWO CORE HALVES HAVING A COEFFICIENT OF THERMAL EXPANSION LESS THAN THAT OF THE FERROMAGNETIC OXIDE USED TO MAKE THE CORE HALVES

FIELD OF THE INVENTION

The present invention relates to an excellent magnetic head in use for the magnetic recording readout device of a video cassette recorder, data storage in a computer, and the like.

DESCRIPTION OF THE RELATED ART

The recording width and recording wavelength are reduced in order to increase the recording density of signals recorded on magnetic recording media as the recording density of the information signals becomes higher in the field of magnetic recording media as, for example, video cassette recorders, storage in computers and the like.

According to this, the track width and gap length of a magnetic head are reduced, and improvement in head efficiency is required in order to compensate for the reduced output of the head caused by the reduction of the flux density going across the gap of the head.

A so-called ferrite head or the like, having magnetic cores of such ferromagnetic oxides as, for example, Mn—Zn ferrite and the like, is known to be a magnetic head having a good readout output.

A gap material is put between the surfaces of magnetic cores to precisely control the magnetic gap formed between the abutting surfaces of a pair of magnetic cores in this kind of magnetic head. Non-magnetic materials, such as $SiO_2$ and the like, are usually used for the gap material.

But there is a problem that the readout output cannot necessarily be optimized because of the different distribution of stresses in the gap when a magnetic head with a narrow track width adheres with molten glass under the same condition. Or, the gap depth becomes almost the same as the track width at a cross section of the gap when the track width is reduced. On the other hand, the track width is larger than the gap depth in a conventional magnetic head. Thus, in the case of a magnetic head with a narrow track width, stress from the glass to the magnetic cores, which is caused by the different coefficients of the thermal expansion of the glass to bond half magnetic cores and of the ferrite, has a different distribution at a cross section of the gap.

Moreover, the amount of ferrite in the neighborhood of the gap becomes smaller while, at the same time, the amount of the glass to the joint magnetic cores increases. Thus, the relationship between the stress from the glass to the magnetic cores and the magnetic characteristics influenced by the stress changes. Accordingly, the magnetic characteristics of the half magnetic core are changed by the stress from the glass because anisotropy changes by stress and magnetostriction resulting in changing the permeability of ferrite.

Glass with a coefficient of thermal expansion smaller than that of the ferrite by about $5 \times 10^{-7}$ to $15 \times 10^{-7}$ per degree Celsius was used in the past since a small compressive stress could be applied to the glass in order to prevent the glass from cracking at various processes of the head.

But, when magnetic cores with a narrow track width are bonded with such glass, and when the distribution of the stress from the glass to the half magnetic cores at the gap, and the magnetic characteristics influenced by the stress change, a magnetic head with the most efficient readout output cannot necessarily be obtained in reality.

SUMMARY OF THE INVENTION

Accordingly, an objective of the present invention is to provide a magnetic head having excellent readout output with a reduced track width by controlling the stress applied to the half magnetic cores from the glass.

To achieve the above-mentioned objective, in accordance with the present invention, there is provided a magnetic head having a pair of magnetic cores made of ferromagnetic oxide, at least one of which has a recess for a coil, and which are bonded together with the glass with a gap material in-between, wherein the coefficient of thermal expansion of the glass to bond magnetic cores together is smaller than that of the ferromagnetic oxide by $20 \times 10^{-7}$ to $35 \times 10^{-7}$ per degree Celsius.

Accordingly, the coefficient of thermal expansion depends on temperature. Here the coefficient of thermal expansion means between 100° C. and 350° C.

When glass adhesion is conducted with the glass with the above-mentioned coefficient, it is preferable to keep the temperature where the viscosity of the glass will be 4.4 to 4.7 Pa·S and to keep the pressure applied between the magnetic cores at 50 kg·f/cm$^2$ or less.

Moreover, Pt, Cr, $Ta_2O_5$, $Al_2O_3$, $SiO_2$ and the like are preferable as the gap material put between the magnetic cores. The gap material could be multilayers of these materials as well as a single layer.

Accordingly, such glass adhesion is most effective, for example, when it is a magnetic head for high-density recording where the gap length is 0.35 μm or less and the track width is 25 μm or less.

In a magnetic head where a pair of magnetic cores made of ferromagnetic oxide are bonded together with glass adhesion, and particularly a magnetic head with a reduced track width and a reduced gap length, the direction and amount of stress from the glass to the magnetic cores become proper resulting in an excellent readout output at the short wave length and long wave length areas when a glass having a smaller coefficient of thermal expansion than ferromagnetic oxide comprising the magnetic cores is used by $20 \times 10^{-7}$ to $35 \times 10^{-7}$ per degree Celsius is used.

These and other objects, features and advantages of the present invention will become more apparent from the following detailed description with reference to the accompanying drawings and it should be understood that various modifications and changes of the present invention can be made without departing from the spirits and the scope of the present invention.

DESCRIPTION OF PREFERRED EMBODIMENTS

The preferred embodiments of the present invention will be described in further detail below but is not intended to constitute a limitation of the present invention.

Figure 1:
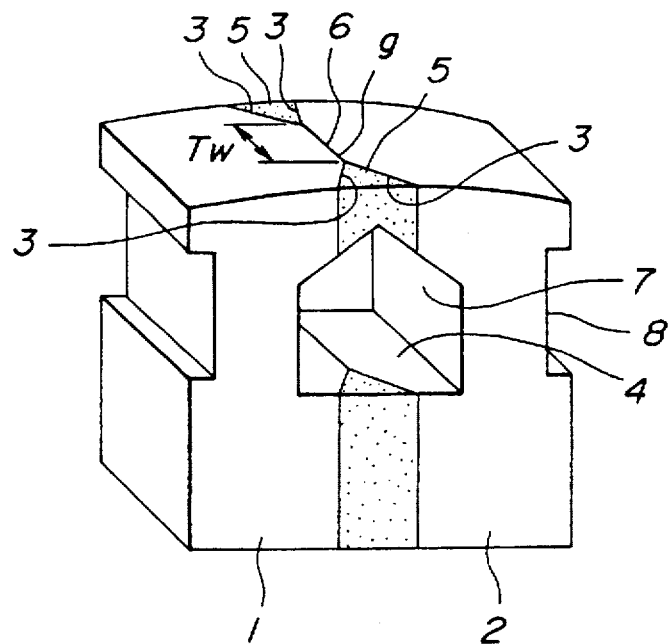
FIG. 1 is a schematic diagram showing one example of a magnetic head according to the present invention.

The magnetic head of the present invention is shown in FIG. 1. As is shown in the figure, in the magnetic head a pair of half magnetic cores (1 and 2) adhere with gap material (6) in-between, and magnetic gap g is formed by the abutting surfaces of half magnetic cores 1 and 2. Accordingly, the magnetic gap (g) is formed by the formation of a film of the gap material at a thickness of 900 Å on each half of the magnetic core and the track width (Tw) is 15 μm and the gap depth is 17 μm.

The above-mentioned half magnetic cores are comprised of ferromagnetic oxide materials such as Mn—Zn ferrite, Ni—Zn ferrite and the like, and the above-mentioned gap materials (6) form on surfaces which would be the above-mentioned abutting surfaces (which include surfaces at the groove to define the track width.) Accordingly, the total thickness of the gap materials (6) on each surface is the gap length of the magnetic head.

Non-ferromagnetic materials, such as Pt, Cr, Ti, $Ta_2O_5$, $Al_2O_3$ and $SiO_2$, and further, alloys which are mainly comprised of Pt, Cr and Ti, can be used for the gap material (6). Among these materials, in particular, Pt, Cr, Ti, $Ta_2O_5$ and alloys which are mainly comprised of Pt, Cr and Ti, are advantageous in checking for a magnetic shorting between magnetic cores (so-called gap short) since they cannot be easily corrupted by molten glass. As the gap material (6), either a single layer of the above-mentioned or layered films of these materials can be applied. Accordingly, in the example, the film of $Ta_2O_5$ is formed by sputtering or the like.

On the other hand, a winding groove (7) having a quasi-rectangular cross-sectional shape in order to wind a coil not shown in the figure as well has to define the gap depth and a winding guide groove (8) are formed on the above-mentioned half magnetic cores (1 and 2). Along the winding groove (7) and the winding guide groove (8), the above-mentioned coil is wound resulting in supplying signal current to a closed magnetic circuit consisting of the above-mentioned half magnetic cores, and getting electrical signals derived from the magnetic signals read by the magnetic head.

Figure 2:
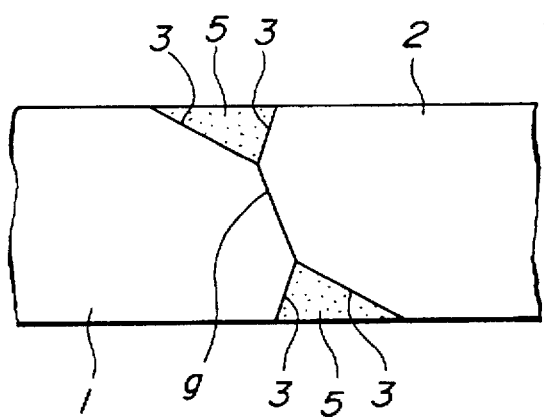
FIG. 2 is a plane view showing the above-mentioned magnetic head seen from the side in contact with a recording medium.

Moreover, quasi-V-shaped track-width controlling grooves (3) are formed at both ends of the abutting surfaces of the above-mentioned half magnetic cores (1 and 2) as shown in FIG. 2. Therefore, a magnetic gap (g) is formed between the abutting surfaces of the half magnetic cores (1 and 2) between the track-width controlling grooves (3). The track width (Tw) of the magnetic gap (g) is controlled by the above-mentioned track-width controlling grooves (3), and means the distance between the bottom (tip of the V-shape) of one width controlling groove (3) and that of the other groove (3).

The track-width controlling grooves (3) are filled with the glass (5) resulting in adhering of the above-mentioned half magnetic cores (1 and 2) into one bonded magnetic core.

Here, in the present magnetic head, for the glass (5), glass with a smaller coefficient of thermal expansion than ferrite of the above-mentioned half magnetic cores (1 and 2) by $20 \times 10^{-7}$ to $35 \times 10^{-7}$ per degree Celsius is used. Though the track width (Tw) is 15 μm, which is narrower than a conventional track width, and the gap depth is 17 μm in the present invention, stress from the glass to the magnetic core becomes proper when the glass with the above-mentioned coefficient of thermal expansion is applied particularly to a magnetic head with such a reduced track width. As a result, he magnetic characteristics of the magnetic cores improve and the readout output increases.

A magnetic head having such composition is made by the following process.

Figure 3:
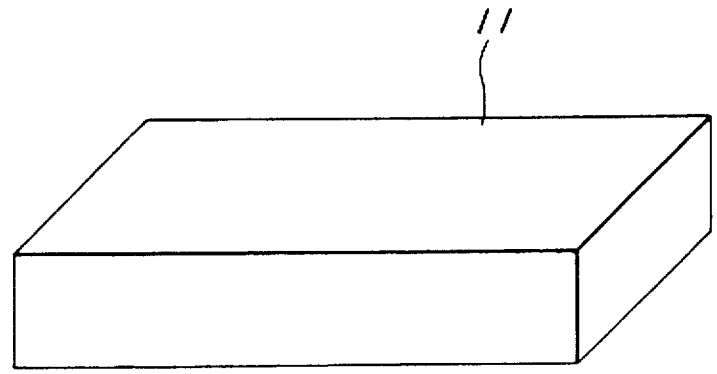
FIG. 3 is a schematic diagram showing the shape of the base substance in the production process of the magnetic head according to the present invention.

First, a quasi-rectangular parallelepiped base substance (11) comprised of such ferromagnetic oxide material as Mn—Zn ferrite, Ni—Zn ferrite or the like as shown in FIG. 3 was prepared, and flat surfaces were formed to be parallel on each side of the base substance. Here the dimensions of the base substance were approximately 34.5 mm in length, 2.5 mm in width and 1 mm in thickness.

Figure 4:
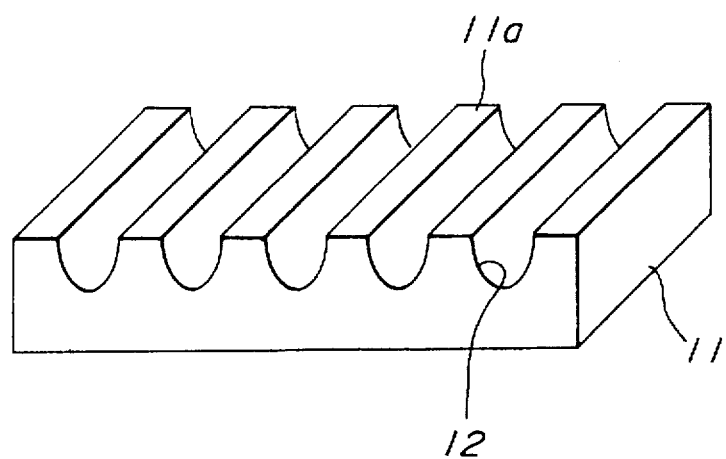
FIG. 4 is a schematic diagram showing the production process of track-width controlling grooves.

Next, as is shown in FIG. 4, a given number of track-width controlling grooves (12) were formed crossways in parallel by machining and grinding on one main surface (11a) of the above-mentioned base substance (11) to leave a 15-μm width of the main surface as the track width (Tw).

In a cross-sectional shape of the track-width controlling grooves (12), the angle of the side surface of the groove to a surface vertical to the main surface at the part where the side surface touches the main surface (11a) is normally between 8 and 45 degrees, but it is not necessarily limited to it and, for example, it could be 0 degree. But if the angle is too small, degradation of the electromagnetic transfer characteristics might result, and, on the other hand, if it is too large, readout noise will be increased because of the ease of picking up signals in an adjacent track on a medium recorded with anti-adimass. Accordingly, in this example, the angle was 30 degrees.

In addition, the depth of the above-mentioned track-width controlling grooves (12) is preferably 200 to 300 μm, but it is not necessarily limited to this range.

Further, a cross-sectional shape of the track-width controlling grooves (12) is usually quasi-U-shaped and quasi-V-shaped but it could be of a polygonal shape other than these.

Figure 5:
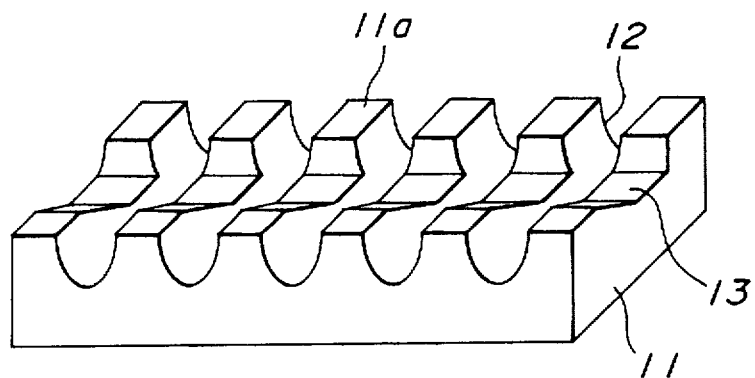
FIG. 5 is a schematic diagram showing the production process of a winding groove.
Figure 6:
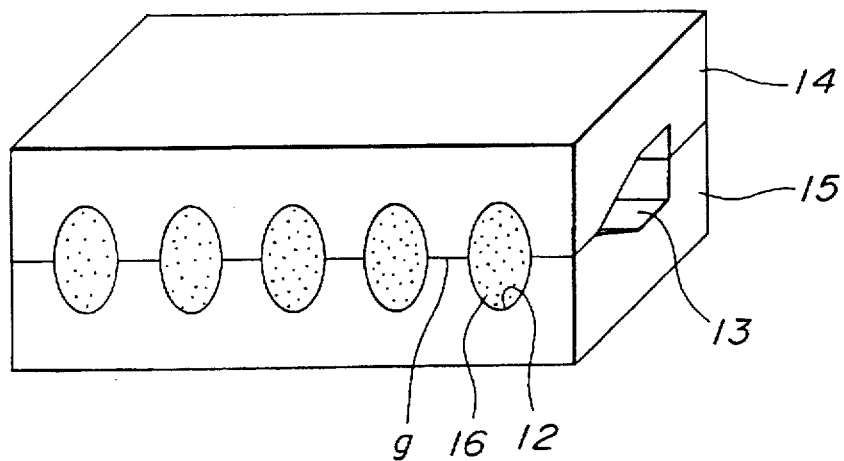
FIG. 6 is a schematic diagram showing the process of glass adhesion.

Next, a quasi-rectangular winding groove (13) was formed at the center of the main surface vertical to the above-mentioned track-width controlling groove (12) as is shown in FIG. 5. The winding groove (13) defines the depth of the magnetic gap, and the coil (not shown in the figure) would be wound in the groove in a later process.

Then, after the above-mentioned main surface (11a) was ground as smooth as about 20 to 100 Å in surface roughness, a $Ta_2O_5$ film with a thickness of 900 Å was formed as the gap material (not shown in the figure) on the whole surface of the above-mentioned base substance (11) including the surface of the above-mentioned track-width controlling grooves (12) and the above-mentioned winding groove (13) (or on the surface which would become the abutting surface) by sputtering in an argon atmosphere with a target of $Ta_2O_5$.

Next, after the core block (14) on which the gap material formed and the core block (15) made in the same way were placed facing together at the gap material with an outline standard, a glass rod for glass adhesion was inserted into the above-mentioned track-width controlling grooves (12). As the glass rod for glass adhesion, glass having a smaller coefficient of thermal expansion by $20\times10^{-7}$ to $35\times10^{-7}$ per degree Celsius than the ferrite comprised of the core blocks (14 and 15). The core blocks (14 and 15) were then heated to a given temperature for molten adhesion under pressure. As a result, the core blocks (14 and 15) were united and a magnetic gap (g) was made between the abutting surfaces. Here at the glass adhesion, the deference in the coefficients of thermal expansion of the glass (16) and the ferrite comprised of the core blocks (14 and 15) causes stress from the glass (16) to the core blocks (14 and 15). In this case, since the coefficient of thermal expansion of the glass (16) is smaller by $20\times10^{-7}$ to $35\times10^{-7}$ per degree Celsius than the ferrite comprised of the core blocks (14 and 15), proper stress from the glass to the core blocks (14 and 15) was applied.

Accordingly, the temperature for glass adhesion should be as high as the viscosity of the glass becomes about 4.4 to 4.7 Pa·S, and the pressure applied to fasten the core blocks (14 and 15) should preferably be as comparatively low as 50 kg·f/cm$^2$ or less. The reason is in order to check for a magnetic shorting (so-called gap short) between the magnetic cores.

Figure 7:
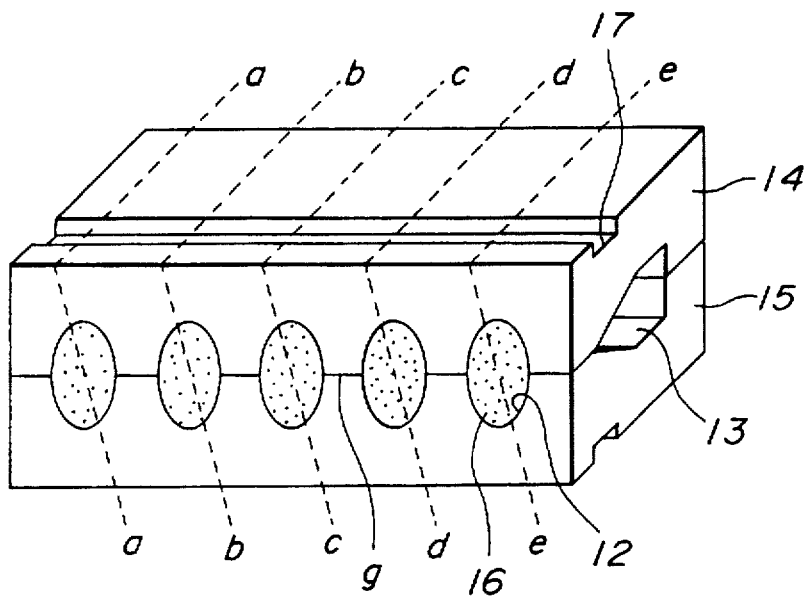
FIG. 7 is a schematic diagram showing the slicing process of core blocks.

Then, a winding guide groove (17) was formed on the side of the core blocks (14 and 15), and a surface which would contact a magnetic recording medium was ground in a convex shape around the core blocks to make a front depth of about 17 μm. Then, they were sliced into chips of a given size along dotted lines (a to e in FIG. 7) having an angle corresponding to adimass.

Then, a coil was wound on each head chip to have an inductance of 1.8 μH. A magnetic head made in this way has an excellent readout output since proper stress is applied from the glass (16) to a magnetic core resulting in the optimized magnetic characteristics of a magnetic core.

The gap was not vertical to the traveling direction of the head or else the gap had an adimass angle in this example, but there was no problem if the adimass angle was 0 degree. In addition, a winding groove (13) was formed on both core blocks (14 and 15) but the winding groove should be formed on at least one of the two core blocks.

Figure 8:
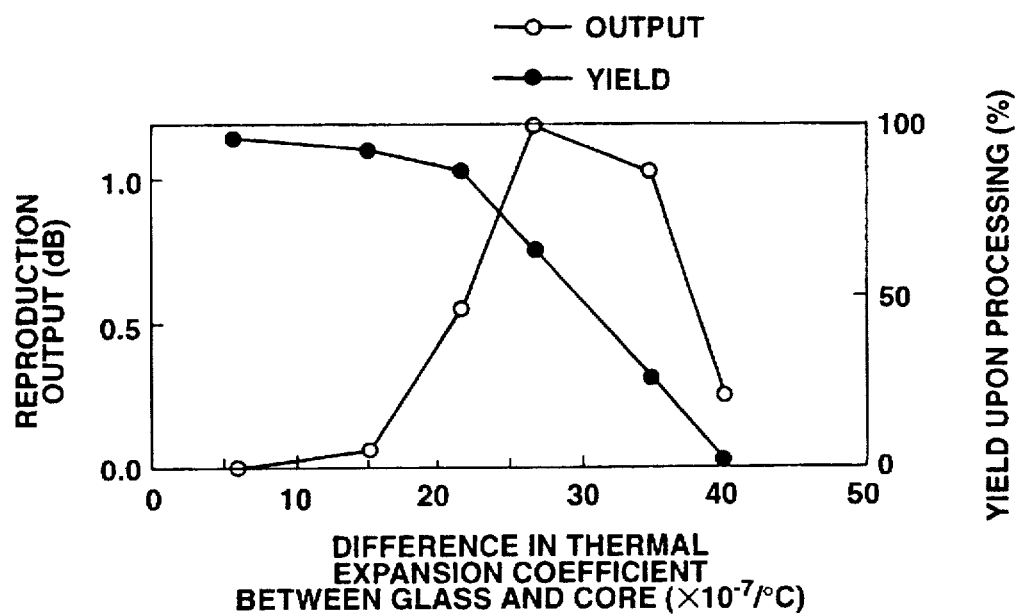
FIG. 8 is a graph showing the relationship of the difference in the coefficients of thermal expansion of the glass and materials of magnetic cores with the readout output and the yield.

Next, the yield during the production process of the magnetic head and readout output of the produced magnetic heads were investigated to check the effect of the control of the coefficient of thermal expansion of the glass by producing magnetic heads with glass of various coefficients of thermal expansion. The result is shown in FIG. 8. The readout output is expressed by the relative value to 0 dB of the readout output for a magnetic head which was made with the glass having a smaller coefficient of thermal expansion than that of ferrite comprising the magnetic head by $5\times10^{-7}$ per degree Celsius.

As is clear in FIG. 8, the readout output becomes largest when glass having a smaller coefficient of thermal expansion than that of ferrite comprising the magnetic cores by $20\times10^{-7}$ to $35\times10^{-7}$ per degree Celsius is used. From this fact, it was recognized that it is proper to use the glass having a smaller coefficient of thermal expansion than that of ferrite comprising magnetic cores by $20\times10^{-7}$ to $35\times10^{-7}$ per degree Celsius in the case of such a magnetic head having a reduced track width. Accordingly, the yield tends to decrease as the deference in the coefficients of thermal expansion of the glass and ferrite comprising the magnetic cores. Therefore, the coefficient of thermal expansion of the glass should be set according to the pros and cons of the readout output and yield.

It is clear from the explanation mentioned above that stress from the glass to magnetic cores becomes proper resulting in optimized magnetic characteristics of the magnetic cores when the track width and gap length are reduced since the glass having a smaller coefficient of thermal expansion than that of ferrite comprising magnetic cores by $20\times10^{-7}$ to $35\times10^{-7}$ per degree Celsius is used in the present invention. Therefore, a high readout output can be obtained achieving high-density recording.

What is claimed is:

1. A magnetic head, comprising:
   a pair of C-shaped magnetic core halves made of a ferromagnetic oxide, at least one of which has a groove for receiving a coil;
   a gap filler material which fills a magnetic gap which exists when the core halves are bonded together;
   track width controlling grooves formed on opposite sides of the magnetic gap; and
   glass bonding the core halves together, the glass filling the track width controlling grooves to bond the core halves together;
   a coefficient of thermal expansion of the glass, as measured between 100 and 350 degrees Celsius, is $20\times10^{-7}$ to $35\times10^{-7}$ per degree Celsius less than that of the ferromagnetic oxide;
   the gap has a length of 0.35 μm or less,
   the head has a track width of 25 μm or less,
   the bonding of the core halves is conducted with the viscosity of the glass between 4.4 and 4.7 Pa*s, and
   the pressure applied to the gap between the core halves in the bonding process is 50 kg*f/cm$^2$ or less.

2. The magnetic head of claim 1, wherein the ferromagnetic oxide is selected from the group consisting of Mn—Zn ferrite and Ni—Zn ferrite.

3. The magnetic head of claim 1, wherein each core half has a layer of gap material within the gap of 900 Å, and the track width is 15 μm and the gap has a depth of 17 μm.

4. The magnetic head of claim 1, wherein the gap has an azimuth angle.

5. The magnetic head of claim 1, wherein each of the track width controlling grooves has a depth, as measured between the gap and a respective outer surface of the head of between 200 and 300 μm.

6. The magnetic head of claim 1, wherein the head has a recording medium facing surface which is convex in shape.

7. The magnetic head of claim 1, wherein the gap filler material comprises one or more layers of material selected from the group consisting of Pt, Cr, Ti, Ta$_2$O$_2$, Al$_2$O$_3$, SiO$_2$ and alloys made of Pt, Cr and Ti.

* * * * *